(12) United States Patent
Jackson

(10) Patent No.: US 9,116,755 B2
(45) Date of Patent: *Aug. 25, 2015

(54) SYSTEM AND METHOD FOR MANAGING A HYBRID COMPUTE ENVIRONMENT

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,589

(22) Filed: Oct. 14, 2014

(65) Prior Publication Data

US 2015/0033241 A1    Jan. 29, 2015

Related U.S. Application Data

(63) Continuation of application No. 12/023,722, filed on Jan. 31, 2008, now Pat. No. 8,863,143, which is a continuation-in-part of application No. 11/276,852, filed on Mar. 16, 2006, now Pat. No. 8,930,536, and a (Continued)

(51) Int. Cl.
*G06F 9/46* (2006.01)
*G06F 9/50* (2006.01)

(52) U.S. Cl.
CPC ............ *G06F 9/5083* (2013.01); *G06F 9/5077* (2013.01)

(58) Field of Classification Search
None
See application file for complete search history.

(56) References Cited

U.S. PATENT DOCUMENTS

| 6,418,459 | B1 | 7/2002 | Gulick |
| 6,571,215 | B1 | 5/2003 | Mahapatro |
| 6,779,016 | B1 | 8/2004 | Aziz et al. |
| 6,931,640 | B2 | 8/2005 | Asano et al. |
| 7,103,664 | B1 | 9/2006 | Novaes et al. |
| 7,177,823 | B2 | 2/2007 | Lam et al. |

(Continued)

FOREIGN PATENT DOCUMENTS

| JP | 2002-207712 | 7/2002 |
| JP | 2006-309439 | 11/2006 |

OTHER PUBLICATIONS

WO 2006/107531 A2, David Jackson, Cluster Resources, Inc; "Simple integration of an on-demand compute environment", Oct. 12, 2006, (WO2006107531A2.pdf; pp. 1-42).*

(Continued)

*Primary Examiner* — Emerson Puente
*Assistant Examiner* — Hiren Patel

(57) ABSTRACT

Disclosed are systems, hybrid compute environments, methods and computer-readable media for dynamically provisioning nodes for a workload. In the hybrid compute environment, each node communicates with a first resource manager associated with the first operating system and a second resource manager associated with a second operating system. The method includes receiving an instruction to provision at least one node in the hybrid compute environment from the first operating system to the second operating system, after provisioning the second operating system, pooling at least one signal from the resource manager associated with the at least one node, processing at least one signal from the second resource manager associated with the at least one node and consuming resources associated with the at least one node having the second operating system provisioned thereon.

10 Claims, 6 Drawing Sheets

Related U.S. Application Data continuation-in-part of application No. 11/276,853, filed on Mar. 16, 2006, and a continuation-in-part of application No. 11/276,854, filed on Mar. 16, 2006, now Pat. No. 8,782,231, and a continuation-in-part of application No. 11/276,855, filed on Mar. 16, 2006, now Pat. No. 8,631,130, and a continuation-in-part of application No. 11/276,856, filed on Mar. 16, 2006, now Pat. No. 7,698,430.

(56) References Cited

U.S. PATENT DOCUMENTS

| | | | |
|---|---|---|---|
| 7,328,406 B2 | 2/2008 | Kalinoski et al. | |
| 7,386,586 B1 | 6/2008 | Headley et al. | |
| 7,536,541 B2 | 5/2009 | Isaacson | |
| 7,546,553 B2 | 6/2009 | Bozak | |
| 7,640,547 B2 | 12/2009 | Neiman et al. | |
| 7,783,786 B1 * | 8/2010 | Lauterbach | 709/252 |
| 7,788,477 B1 | 8/2010 | Huang et al. | |
| 8,037,475 B1 * | 10/2011 | Jackson | 718/104 |
| 8,370,898 B1 | 2/2013 | Jackson | |
| 2002/0120741 A1 | 8/2002 | Webb et al. | |
| 2004/0260746 A1 | 12/2004 | Brown | |
| 2005/0125538 A1 | 6/2005 | Tawil | |
| 2005/0132379 A1 | 6/2005 | Sankaran et al. | |
| 2005/0154861 A1 | 7/2005 | Arimilli et al. | |
| 2005/0204040 A1 | 9/2005 | Ferri et al. | |
| 2005/0262508 A1 | 11/2005 | Asano et al. | |
| 2005/0278760 A1 | 12/2005 | Dewar et al. | |
| 2006/0010445 A1 | 1/2006 | Peterson et al. | |
| 2006/0037016 A1 | 2/2006 | Saha et al. | |
| 2006/0053216 A1 * | 3/2006 | Deokar et al. | 709/223 |
| 2006/0117208 A1 | 6/2006 | Davidson | |
| 2006/0129667 A1 | 6/2006 | Anderson | |
| 2006/0136908 A1 | 6/2006 | Gebhart et al. | |
| 2006/0143350 A1 | 6/2006 | Miloushev et al. | |
| 2006/0156273 A1 | 7/2006 | Narayan et al. | |
| 2006/0212332 A1 | 9/2006 | Jackson | |
| 2006/0212333 A1 | 9/2006 | Jackson | |
| 2006/0212334 A1 | 9/2006 | Jackson | |
| 2006/0212740 A1 | 9/2006 | Jackson | |
| 2006/0224741 A1 | 10/2006 | Jackson | |
| 2006/0230149 A1 | 10/2006 | Jackson | |
| 2007/0022425 A1 * | 1/2007 | Jackson | 718/104 |
| 2007/0094665 A1 * | 4/2007 | Jackson | 718/104 |
| 2008/0155100 A1 | 6/2008 | Ahmed et al. | |

OTHER PUBLICATIONS

WO 2006/108187 A2, David Jackson, Cluster Rescources, Inc, "On-Demand Access to Compute Resources", Oct. 12, 2006, (WO2006108187A2.pdf; pp. 1-49).*

Kavas et al., "Comparing Windows NT, Linux, and QNX as the Basis for Cluster Systems", Concurrency and Computation Practice & Experience Wiley UK, vol. 13, No. 15, pp. 1303-1332, Dec. 25, 2001.

* cited by examiner

SYSTEM AND METHOD FOR MANAGING A HYBRID COMPUTE ENVIRONMENT

PRIORITY INFORMATION

The present application is a continuation of Ser. No. 12/023,722, filed Jan. 31, 2008, which is a continuation-in-part of U.S. patent application Ser. No. 11/276,852, filed on Mar. 16, 2006, and also a continuation-in-part of U.S. patent application Ser. No. 11/276,853, filed on Mar. 16, 2006, and also a continuation-in-part of U.S. patent application Ser. No. 11/276,854, filed on Mar. 16, 2006, now U.S. Pat. No. 8,782,231, issued Jul. 15, 2014, and also a continuation-in-part of U.S. patent application Ser. No. 11/276,855, filed on Mar. 16, 2006, now U.S. Pat. No. 8,631,130, issued Jan. 14, 2014, and also a continuation-in-part of U.S. patent application Ser. No. 11/276,856, filed on Mar. 16, 2006, now U.S. Pat. No. 7,698,430, issued Apr. 13, 2010, the content of which are incorporated herein by reference in their entirety.

BACKGROUND OF THE INVENTION

1. Field of the Invention

The present invention relates to a hybrid compute environment such as a cluster in a grid in which multiple different types of operating systems exist on various nodes within the compute environment and more particularly to a system and method of managing automated provisioning wherein operating systems on one or more nodes may be automatically reprovisioned to be separate operating systems based on various factors such as needs associated with pending or predicted workload.

2. Introduction

A high performance computing (HPC) typically refers to the use of parallel super computers and computer clusters that comprise multiple processors linked together in a single system with a commercially available interconnection. While a high level of technical skill is typically needed to organize and manage such systems, they can be created with commodity components. Because of their flexibility and relatively low cost, HPC systems increasingly dominate the world of super computing. HPC has traditionally been dominated by the Linux operating system. However, experts predict that Microsoft® Windows-based data centers, clusters or compute environments may become more prevalent in the near future. This may be due to a variety of factors such as Microsoft's® strong relationship with application vendors, many of whom have already ported their HPC applications to Windows Compute Cluster Server 2003 (CCS). Further, there is an increasing demand for work group clusters which primarily involves a market segment composed of Window users who are new to the HPC concept. As a result, HPC environments that strictly ran Linux in the past are exploring the options of Windows-based clustering. The Window/Linux Hybrid cluster reduces a Linux environment's barriers to adopting Windows in the HPC environment. However, there may be difficulty in the flexibility required when attempting to manage a hybrid environment in which some nodes may run a first computer operating system such as Linux and other nodes may run a second operating system such as a Windows-based operating system. Accordingly, what is needed in the art is an improved method of managing a hybrid clustering environment.

FIG. 2A illustrates several different compute environments and also may represent a single hybrid compute environment. A first environment 200 may represent a separate compute environment or a portion of a hybrid compute environment. While the Linux operating system and a Windows-based operating system are discussed, it is contemplated that the present invention would relate to any first operating system that is different from a second operating system. There are many different types of operating systems such as a Macintosh operating system and so forth that are contemplated as within the scope of the present invention and the use of the terms of Linux and Windows are only used inasmuch as they are prevalent types of operating systems and enabling the flexibility within these two types of operating systems triggered the development of the present invention.

Nodes 202 represent a first operating system, such as a Linux operating system, that is managed by a first resource manager 204. As would be known in the art, this first resource manager may are TORQUE, Platform's Load Sharing Facility (LSF), PBS Pro from Altair Engineering and so forth. These resource managers typically, as is known in the art, enable the nodes 202 to communicate with a workload manager 206 that receives jobs 208 that are submitted by users. Environment 210 represents a Windows-based environment (i.e., a second operating system) which again may be a part of the same hybrid compute environment or a separate environment in which nodes 212 run a Windows-based operating system such as Windows' compute cluster server (CCS). A resource manager 214 for the second operating system enables a workload manager 216 to communicate with the Windows-based nodes. Again, jobs 208 may be submitted through the workload manager 216 which communicates with the resource manager 214 to enable the jobs to actually consume resources within the environment 210.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the art with regards to managing a hybrid compute environment. The ability to have a hybrid Windows and Linux cluster increases the number of addressable users and improves cluster efficiency. Recent developments in workload management software such as MOAB® from Cluster Resources, Inc., enables users to increase their productivity and utilization and broaden their reach by tapping into the larger base of scientists and engineers who use a Windows-based system. Management software, such as the MOAB software, provides an intelligent scheduling policy engine to optimally determine when the operating system should be modified based on workload and defined policies. When conditions are met, the management software can trigger a change via a sites preferred operating system modification technology such as diskfull or diskless provisioning, dual boot or virtualization. For example, these methodologies are known to those of skill in the art.

The invention comprises systems, compute environments, data centers, methods and computer readable media for managing workload in the hybrid multi-node compute environment wherein at least one node has a first operating system controlled by a first resource manager and at least one node has a second operating system controlled by a second resource manager. The method includes establishing a policy of balancing nodes in the compute environment between the first operating system and the second operating system, periodically analyzing the compute environment to determine how well it aligns with the established policy and based on the analysis, provisioning nodes in the compute environment to change at least one node from the first operating system to the second operating system or at least one node from the second operating system to the first operating system according to the established policy.

Another aspect of the invention is that the method involves dynamically provisioning a node for a workload in the hybrid compute environment. Each node communicates with a first resource manager associated with the first operating system and a second resource manager associated with the second operating system. The method includes receiving an instruction from a workload manager to provision at least one node in a hybrid compute environment from a first operating system to the second operating system. After provisioning the second operating system, the system pools at least one signal from the first resource manager associated with the at least one node and processes at least one signal from the second resource manager associated with the at least one node and enables the consumption of resources associated with the at least one node having the second operating system provisioned thereon.

An example of this concept in practice would be if a ten node cluster has a current state in which three nodes are provisioned with a Windows operating system and seven nodes are provisioned with a Linux-based operating system, assume that a job is submitted that would require five nodes operating a Windows running system. A workload manager or other software module would generate an instruction to provision two nodes in the compute environment to the Linux operating system to the Windows operating system. The Linux nodes may be associated with resource managers such as torque, LSF or PBS pro or as would be known in the art. The Windows-based nodes may be communicating with a Windows-based resource manager. An issue occurs when reprovisioning operating systems with regards to which resource manager to utilize and how a workload manager would manage various state signals or other information signals from a resource manager associated with a status of a given node. Under this example, each of the two nodes that are provisioned from a Linux operating system to a Windows operating system would each have resource managers that may be associated with each node. However, when a Linux operating system is provisioned on a node, the Windows-based resource manager would not recognize the node and thus be sending state signals that might indicate that the node is down. However, the workload manager would intelligently know that what is actually occurring is the provisioning or the use of a separate operating system and would intelligently pool such state signals when an alternate operating system is functional on a node. In this regard, the system, when reprovisioning from a Linux environment on several nodes to a Windows-based environment, would switch from pooling state signals from a Windows-based resource manager to pooling the signals from a Linux-based resource manager when the nodes are provisioned to a Windows-based operating system. The system performs the necessary translation, conflict litigation and conflict management inside the various conflicting reports from the resource managers in order to automatically transition the appropriate number of nodes to the desired operating system.

The pooled signals are intelligently ignored with regards to workload being consumed but may be referenced or accessed by the workload manager to understand the capabilities and history of a given node to know what operating system may next be provisioned on that node and to maintain a history for the node for accounting or other analysis.

A hybrid cluster model according to the principle disclosed herein consolidates administration and centralizes job submission across both operating system platforms. Administrators can command both operating system policies and workload from one unified console. The software or system operating as disclosed herein also makes the dual-operating system nature of the cluster environment transparent and use by applying application and workload information that insure job running on the operating system without the end user needing to specify it.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
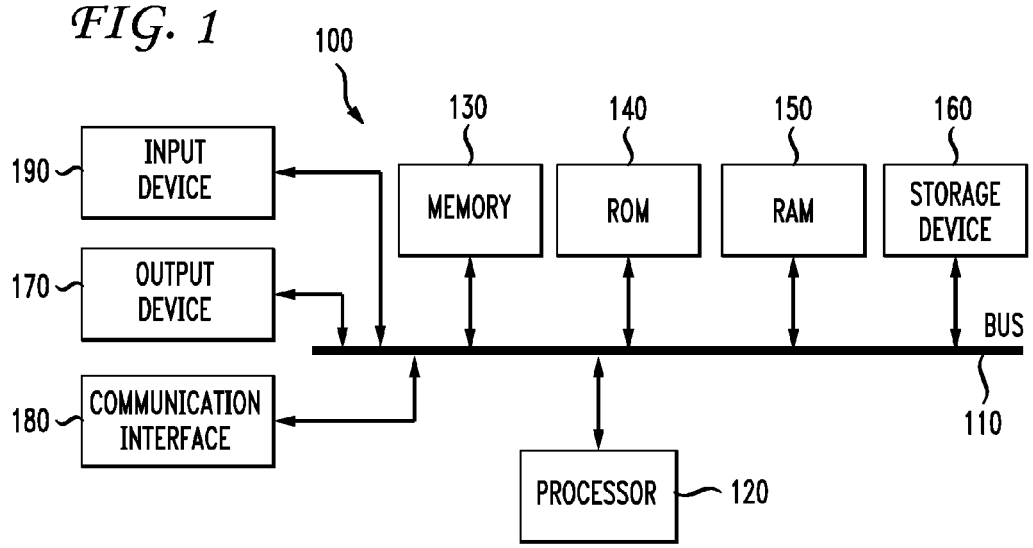
FIG. 1 illustrates the basic hardware components according to a system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2A:
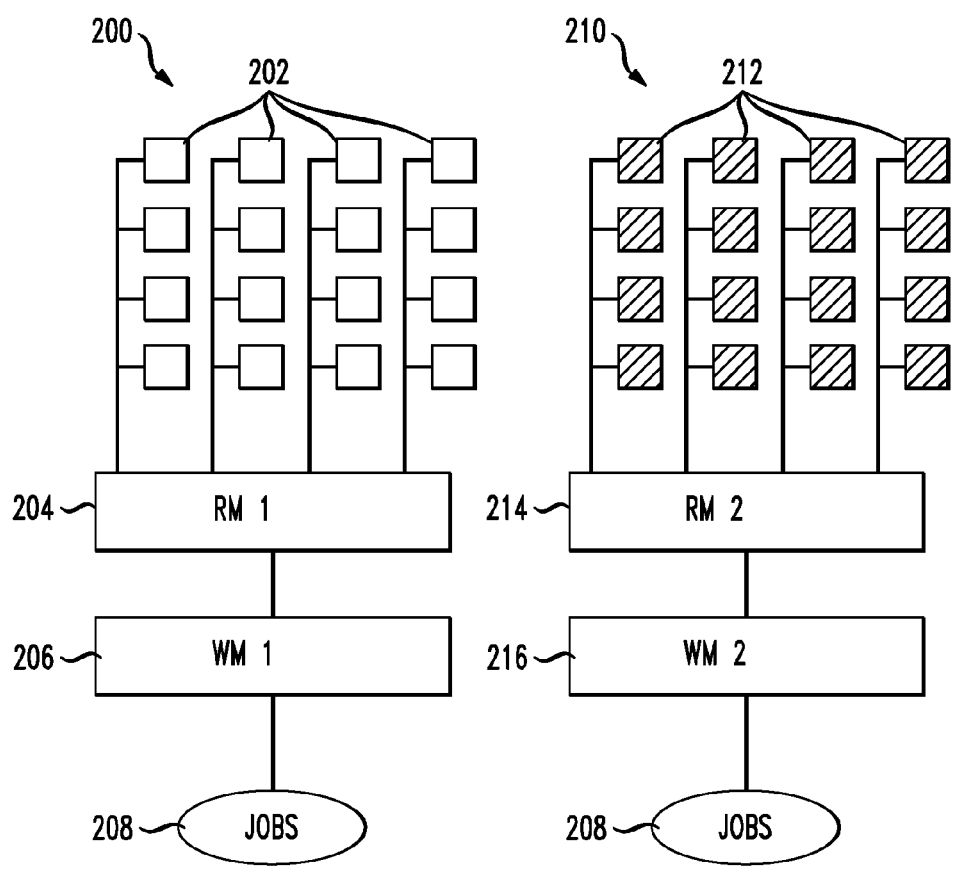
FIG. 2A illustrates a prior art approach to hybrid clustering.
Figure 2B:
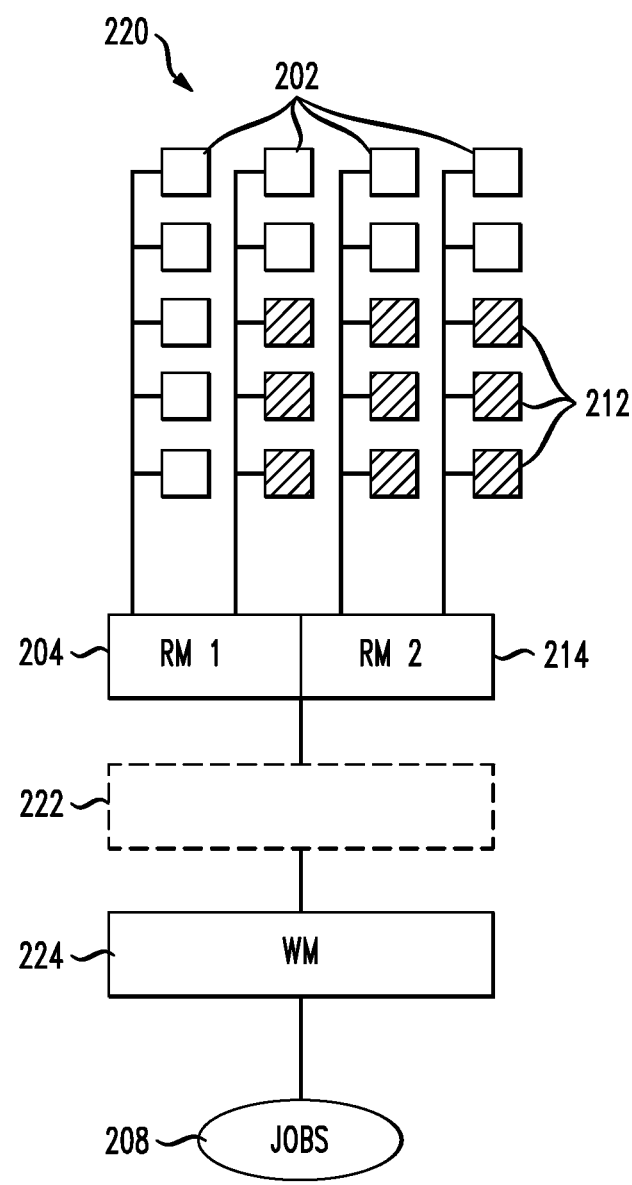
FIG. 2B illustrates an example environment according to an aspect of the invention.

We next turn to FIG. 2B which illustrates a hybrid compute environment according to an aspect of the present invention. In FIG. 2B, hybrid environment 220 includes a number of nodes 202 that run a first operating system, such as Linux, and a second group of nodes 212 that operate a second operating system, such as a Windows-based operating system. There may also be nodes which operate a third or fourth operating system and the principles of the present invention clearly encompass flexibility for an additional operating system according to the needs of users in the environment. Each node has at least two resource managers associated with it. The first resource manager 204 is configured to manage workload on nodes running the first operating system. The second resource manager 214 is configured to manage workload on nodes running a second operating system. As noted above, there may be a third, fourth and perhaps even more resource managers depending on the number of different types of operating systems. Furthermore, there certainly may be different resource managers for a same type of operating system. For example, some Linux-based nodes may communicate with a workload manager via LSF, while other Linux-based nodes may communicate with the workload manager via TORQUE and so forth. The present disclosure enables a desired level of flexibility that can be transparent to end users. Feature 222 represents the intelligence of the present disclosure. It may operate as an interface between resource managers and a workload manager or may represent modifications to the workload manager. In essence, the particular location within the entire process of receiving jobs and actually consuming resources within a compute environment, it does not matter where particular functions occur in the various modules that communicate with one another in order to actually efficiently consume resources within the environment. Accordingly, module 222 is generically represents an interface between a workload manager 224 and two or more resource managers 204, 214.

Figure 3:
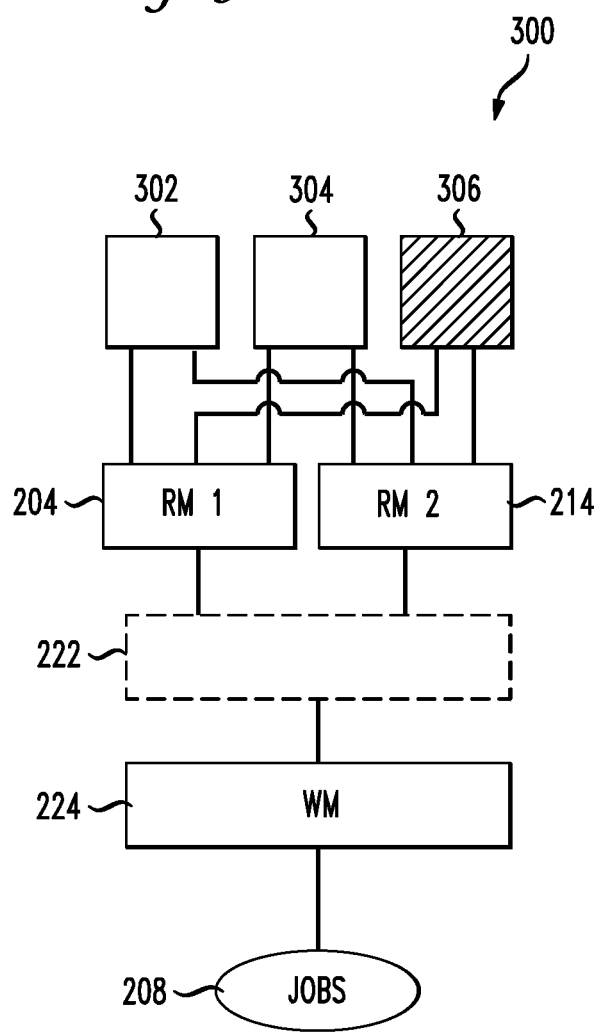
FIG. 3 illustrates another aspect of an environment according to an aspect of the invention.

FIG. 3 further illustrates the general application of the use of multiple resource managers associated with each node. In this case, node 302 is shown as having a communication link with the first resource manager 204 and the second resource manager 214. Similarly, nodes 304 and 306 are each shown as having a communication link to a respective resource manager which each through the interface 222 communicates with the workload manager 224.

As is known in the art, the resource managers actually monitor the resources in the compute environment, the jobs that will consume resources and also take actions on the workload. The resource managers would actually manage the process of cancelling a job or starting a job on a particular node. Workflow management software such as MOAB, instructs the resource managers with regards to how to implement workload in the environment. The present invention generally relates to the creation of the interface 222 that talks to one or more resource managers and enables the ability for a batch system itself to intelligently determine that a particular job requires a particular operating system. The interface 222 maybe incorporated in whole or in part with the workload manager 224. In this case, the system will dynamically provision the particular operating system and if necessary change one node from running a first operating system back to a second operating system, while at the same time either activating, bring up or processing differently state information from a resource manager associated with the second operating system and then running the job transparently to a user. This process involves translation, conflict mitigation and conflict management inside the conflicting reports from resource managers 204, 214 because as the provisioning occurs, the resource managers associated with the first operating system will begin to send signals such as state signals that the node is down. However, the resource manager associated with the second operating system into which the node has been provisioned is going to start to send signals that the node is up and has particular attributes and is ready to consume workload. Accordingly, the interface 222 mitigates and manages the conflicting information such that the end user can simply, through a common and well known interface, submit nodes into the compute environment and have workload consume resources within a hybrid compute environment in a transparent fashion.

In one aspect, signals from a node that is "down", i.e., another operating system is provisioned on the nodes, will be intelligently pooled such that the latent information may be used for accounting, historical knowledge about the node and for information to aid in knowing what future operating system(s) may be provisioned on that node.

Dual booting has previously been a manual process and has rarely been used in batch environments or data center environments and is a fairly static experience for people. For example, typically, the dual boot experience is the act of installing multiple operating systems on a single computer and then as a user boots up, enabling the ability to choose which one to boot into. The present invention differs inasmuch as it is not a manual process and is an automated process that involves the various modules and software necessary to efficiently run a batch environment or data center environment. In one aspect, the system or user may study policies or intelligence such that if a job comes in with certain configurations or requirements, on-demand resources can be switched and reprovisioned in order to run the right environment. As an example, if a Windows job is submitted and the system cannot find enough Windows nodes, the system can automatically provision Windows nodes and then submit the job into the environment to consume those newly-provisioned resources.

Other aspects can be employed to intelligently manage the hybrid environment. For example, an administrator may determine that he or she wants to maintain a certain number of nodes in a particular type of operating system. If the system then ever has a node which is reprovisioned from a first operating system to a second operating system, the system can then automatically reprovision other nodes within the hybrid environment to comply with the policy of maintaining a certain number of nodes that run a certain operating system. Policies may be established and followed for any purpose. For example, to maintain QoS per a service level agreement (SLA), for a certain number of nodes for customer X, based on time of day, and so forth. Any policy related to the management of resources may be established and followed in the hybrid environment. The system maximizes workload throughput with a single self optimizing system that can balance the number of nodes running particular operating systems against user/group and workload service levels.

The policies may be fault tolerance policies or heightened availability policies associated with failures of compute resources, network resources or other resources, reprovisioning to pools to handle such requirements or to ensure that on-demand resources are available, provisioning for a specific workload but also for handling situations in violations or threshold scheduling requirements. Reprovisioning may be done for a predicted violation of a threshold or a policy requirement. An example of this is where, if based on an analysis, there is a prediction that there may be a violation of a policy requirement, such as an on-demand environment that is needed, or a particular parameter in a service level agreement is not going to be met based on some events such as a failure, current workload issue or predicted workload issue, that an automatic reprovisioning may occur and may be implemented in advance of the predicted failure or other predicted event such that the event does not occur. The necessary resources are provisioned and prepared in order to meet and maintain a policy or a service level agreement in any particular instance. Another example of this involves monitoring the environment and future workload as well as historical information in order to identify a prediction of a certain future event that may violate a policy or a service level agreement. In such a case, the system institutes or automatically submits an instruction, such as a system job or other kind of provisioning instruction, which may trigger a reprovisioning in order to avoid the occurrence of the predicted event absence the reprovisioning.

There are other aspects of managing the compute environment that may be employed. For example, an administrator or a policy may be established to enable a certain type of response time or enable a certain volume of throughput or manage backlog with a certain performance criteria and so forth. For example, if the backlog rises above or below a particular target, then the system can automatically begin to reprovision nodes to process the backlog and reestablish a particular balance according to desired parameters. For example, if the user wants to maintain a proportional balance between the two groups of nodes running different operating systems. The administrator may establish that in the hybrid environment, Windows jobs should only wait 20% longer than Linux-based jobs and should continually balance operating systems on various nodes to maintain that policy requirement.

Another aspect that is beneficial according to the ability of the present invention is that the system can schedule maintenance. For example, instead of bringing the entire hybrid environment to a halt, the system can actually schedule a job as a provisioning step. The workload manager can intelligently place the operating system switch operation between consumption jobs and schedule that both for now and for the future so that it has a minimal impact on the system. These may be accomplished via dynamic service jobs which use intelligence behind the scenes to provide information regarding a hierarchal scheduling where the system can schedule jobs on top of jobs and enable a particular resource pool within the environment to either grow or shrink according to policies. On top of these dynamic service jobs are the actual compute jobs that are running Thus, the submission of a provisioning step that is associated with a job or a system job may be accomplished using the principles disclosed herein.

Furthermore, other aspects may be employed such as setting up an arbitrary calendar and determining how the configuration of the hybrid environment should be over a timeframe that piggybacks on a standing reservation capability to allow the mixture to be implemented in the environment. For example, the system may start Saturday morning at 2:00 am to reprovision the environment in a certain manner to change the balance between Windows and Linux operating systems inasmuch as there is a standing reservation for a particular job (such as a weather analysis for a television station) that requires more Linux-based nodes than are configured under the standard policy. Accordingly, the administration of the hybrid environment can enable any type of arbitrary event to trigger provisioning. If a cybase database server goes down and then the policy requires the system to add four more nodes over to one pool of nodes as opposed to another pool, one can implement jobs or instructions to perform any kind of provisioning action which can be triggered by any event.

One benefit of the present disclosure is that from an end user's point of view, or from an administrators or managers point of view, the manager can utilize a single cohesive resource, which may be the workload manager 224, which can combine the policy space, the single cohesive accounting space and single management space in order to greatly simplify and eliminate human interaction to obtain a highly flexible and efficient utilization of the hybrid environment. Furthermore, the end user can have a single common submission and job management space for all of his or her workload which can look unified to everybody and which also takes advantage of the provisioning technology. Therefore, users having a tool for Windows submissions can continue to use their Windows submission tool which can differ from an end user's Linux submission tool but which can both provide access to the hybrid compute environment from these familiar interfaces for individual users.

Furthermore, users can use an application programming interface (API), a command line up, a web-based or standard desktop GUI and can also continue to submit directly to the resource manager by bypassing the workload manager entirely if they choose. Another benefit is that there are no wasted cycles in the approach disclosed herein. Because the operating systems are automatically switched back and forth, there are no wasted cycles in that there would be no or less cycles in which an operating system is idle. For example, often there are concerns from users that they do not know what kind of operating system the jobs are going to get and the administrator may not know what the job mix is going to be and therefore, do not know if it is going to change day-to-day or hour-to-hour during the same time of the day. These are common challenges that administrators have. However, using the interface or the workload manager according to the principles disclosed herein, the system can automatically provide the provisioning and understand the workload in order to relieve an administrator of these types of concerns.

There are a myriad of mechanisms and opportunities to control the environment using the principles herein. For example, the user may have the ability to specify the rate at which the workload manager would automatically adapt the clusters. For example, the workload manager can instruct the system to optimize itself once an hour, once a minute, once a day, once a week, based on a detected event and so forth. In this respect, the system may, at the appointed time, evaluate a history associated with the consumption of resources, the history associated with job submissions, current workload, current network environment parameters and make an adjustment that can results in an optimum balance in a performance matrix associated with the environment. Thus, rather than setting a strict balancing between nodes operating a first operating system and nodes operating a second operating system, a policy could be established to optimize certain parameters which enables the system to be flexible in balancing the proportion of nodes operating a first operating system and a second operating system (or third and fourth operating system as well) according to its evaluation. Thus, historical use, current activity and pending workload can all be evaluated at a certain time or a variable time in order to provide optimum balance in the environment.

As has been noted above, when switching from one operating system to another operating system, the system can use virtualization, disk-full or diskless provisioning or any other known mechanism which may involve switching from one operating system to another. The workload manager will schedule a provisioning operation preferably using a system job. The system job may indicate, for example, to switch node 13 from a Windows operating system to a Linux operating system. However, the system knows that there is a job running for another seven minutes in the Windows environment so it is going to schedule this job to start in seven minutes. The system job that is scheduled is an operation that will instruct the system either to reboot into a particular image or to net boot into a particular image at this time or actually start a provisioning operation to actually reinstall the operating system over a new image. In this example, the original job will complete and the subsequent system job is initiated and actually makes the change. When the change is made, switching from Windows to Linux, a node Daemon such as the CCS Daemon is reported as down because it is no longer operating inasmuch as it is now running the Linux operating system. While the CCS continues to report to the workload manager that the node is down, the workload manager is intelligent enough to understand and ignore or pool that state information signal because it is communicating with a different resource manager associated with the Linux operating system that reports that that is now up and running. In other words, the interface to the workload manager or the workload manager has the intelligence to communicate with multiple resource managers and understands which resource managers to trust. Thus, the workload manager using the specialized settings and intelligence setting disclosed herein, to pay attention only to the resource manager that is appropriate. Thus, all the state information, attribute information and everything else that provides information via the resource manager associated with the newly-provisioned node is communicated and intelligently utilized to continue to enable the submission of jobs in the newly provisioned node or nodes.

Thus, an important aspect of the present invention is informing the schedule of an appropriately configured system job to indicate that it is time to switch operating systems in such a manner that it is seamless to the end user and administrator and hiding all the "down nodes" and remapping all of the attributes and retaining all the accounting statistics across this changed environment occurs.

Figure 4:
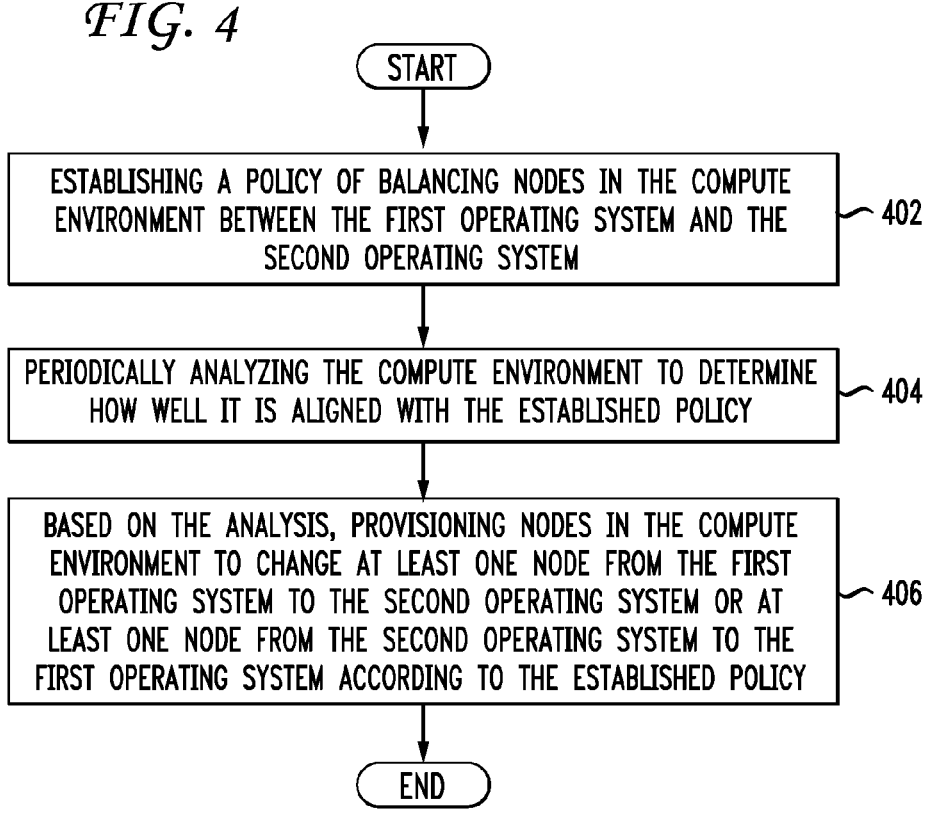
FIG. 4 illustrates a method embodiment of the invention.

With these principles in mind, next we discuss FIG. 4 which illustrates a method of managing workload in a hybrid multi-node compute environment wherein at least one node has a first operating system controlled by a first resource manager and at least one node has a second operating system controlled by a second resource manager. The method includes establishing a policy of balancing nodes in the compute environment between the first operating system and the second operating system (402), periodically analyzing the compute environment to determine how well it is aligned with the established policy (404) and based on the analysis, provisioning nodes in the compute environment to change at least one node from the first operating system to the second operating system or at least one node from the second operating system to the first operating system according to the established policy (406). The analysis may be based on at least one of historical use, current activity, pending workload and anticipated requirements. Other factors such as anticipated faults or violations of policies may trigger reprovisioning. For example, the anticipated requirements may be based on predicted workload requirements according to existing and/or anticipated reservations for the consumption of resources. The anticipated requirements may not be related to workload or predicted workload. For example, a particular architecture may be needed in the compute environment for a particular future purpose. Thus, a future requirement may relate to the provisioning of an environment or structure in the future. For example, an environment may be needed for testing, bench marking, failure analysis, maintenance or any specific use that differs from batch processing. The environment may also be needed to provide data center services or persistent services. Another example of the policy is to provide load balancing based on an amount of backlog associated with what type of response time each particular partition. Response time may relate to throughput, load, calendar, particular selectable workload, failures and so forth. Thus, the policy or policies may be related to a broad number of factors. Preferably, the provisioning occurs by a workload manager issuing a system job that instructs the resource manager to provision at least one node according to a provisioning policy. The provisioning policy may cause a system job to provision at least one node in between scheduled compute jobs. This is an example that was eluded to above wherein the system job may wait seven minutes until the completion of a consumption job occurs at which point the provisioning can occur.

There may be other aspects of this as well wherein reservations or the balancing of compute jobs may be adjusted in order to enable the provisioning. For example, assume that one compute job is currently being processed and is scheduled to complete in ten minutes and another compute job is scheduled to start eleven minutes from now. The provisioning that is associated with the system job would require three minutes to switch operating systems, then the method may involve performing slight modifications to scheduled compute jobs in order to enable the necessary time to complete a provisioning associated with a system job. Thus, a system job is used as the mechanism to schedule and manage the provisioning in-line with all of the workload policies that are currently in place. This provides an integrated method of accomplishing provisioning that complies with all established policies for the environment.

Figure 5:
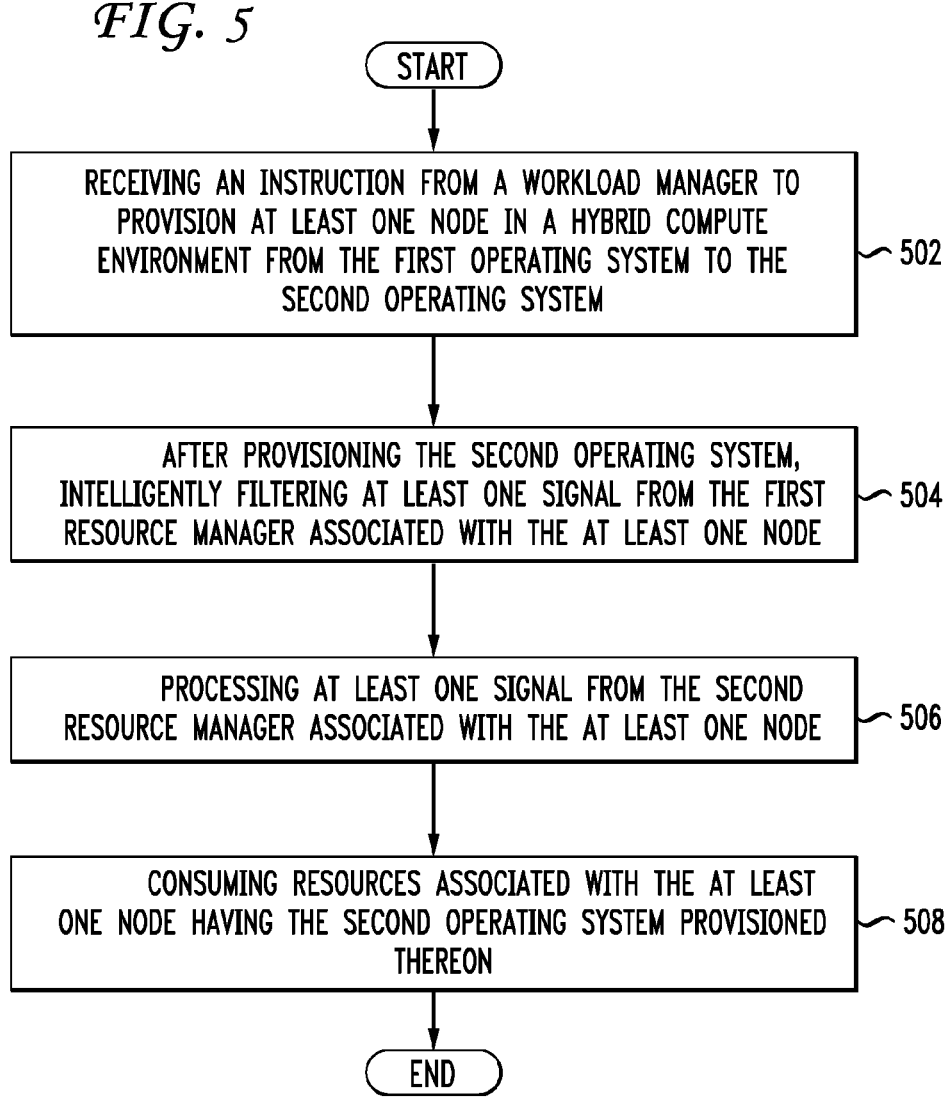
FIG. 5 illustrates another method embodiment of the present invention.

In another aspect of the invention, a method of dynamically provisioning a node for a workload in a hybrid compute environment having a plurality of nodes is disclosed. In the dynamic computing environment, each node communicates with a first resource manager having a first operating system and a second resource manager associated with a second operating system. The method is illustrated in FIG. 5. The method includes receiving an instruction from a workload manager or other software or hardware component or module to provision at least one node in a hybrid compute environment from the first operating system to the second operating system (502). After provisioning the second operating system, the system intelligently filters, pools or ignores at least one signal from the first resource manager associated with the at least one node (504) and processes at least one signal from the second resource manager associated with the at least one node (506). If multiple resource managers were simultaneously reporting two different states for the same physical object or node, then they are in conflict because one would be active and one would not be active. The system is intelligent to ignore certain data that is in conflict with other data. Thus, the system knows to intelligently filter pool, or ignore certain signals from an inactive resource manager. For example, state information is important for the active and non-active resource manager. Other data includes features, capabilities, queries, attributes, policies, rule sets associated with nodes and with one or more of the resource managers for a node. Thus, for the disabled operating system, some information is still needed. Configuration, capabilities, supported operating systems, what software and operating systems the node can switch back to or be provisioned to and so forth. The intelligent filter preferably involves pooling inactive node signals and data for historical, accounting and reprovisioning knowledge. The pool may be termed a latency pool for a down node. The pool may switch from being latent to active depending on whether the operating system associated with the pool (and the particular resource Manager) is provisioned on the node.

The system identifies what attributes should persist such that the workload manager with its intelligence can know if it switches back to another environment for a node, that there is a collection of attributes, policies and constraints associated with the environment to know if it is a good decision. However, the workload manager knows that the collection of information is latent information about the attribute, policies and constraints for a node. This information is known to only effect the environment after the appropriate provisioning takes place. In this regard, the system conceptually places the information in a latent pool of information that can be accessed if the system determines that it is a good idea to reprovision the node. The attribute information is redirected and isolated the information for a subset of evaluation that relates to whether or not provisioning is a good step and whether or not subsequent workload would fit on a particular node. In one example, the system generates a list of possible images or possible versions of a resource. The system knows a node is active with current operating systems, job queue, set of features and policies—all of which are active for workload that consumes a node's resources. But, if the system were to flip a switch to provision the node differently, then that new node picks up a new operating system, but also picks up another collection of attributes, policies, etc., that are from a latency pool. Therefore, the system maintains these lists of attribute pools for each potential operating system. Each node may have one, two, three or more latency pools of information.

The compute environment may then consume resources associated with the at least one node having the second operating system provisioned thereon (508). As noted above, the workload manager can receive and intelligently filter or pool into a latency pool at least one signal from the first resource manager associated with the at least one node and the workload manager can then process at least one signal from the second resource manager to manage the consumption of resources on the at least one node having the second operating system provisioned thereon. The signals relate to states, attributes, policies and constraints for that node when switching operating systems. The system will begin to utilize data from a latency pool to an active pool as well as begin to pool data from the outgoing operating system to a latency pool. Thus, the system knows how to switch between latency pool of information and an active pool of information. Once a node is provisioned and an active pool of information is associated with the nodes, then workload begins to be scheduled onto that space. There is always an understanding that if the system were to schedule a change step, or a node provisioning step, that associated with that change workload be a change in the attribute pool.

In one aspect, the second operating system or first operating system may be a Microsoft® operating system. The method may further include remapping attributes and retaining accounting statistics from the first operating system to the second operating system. In this regard, when the system remaps attributes it does not disregard statistics. The system maintains operating system level statistics as well as physical node statistics, such that the system can maintain a view of the statistics for a particular resource or a particular node through its life cycle. Thus, as a particular node through its life cycle and switching between operating systems, the system can maintain an understanding of the use of that resource through its life cycle. In another aspect, the method includes performing a translation, conflict mitigation and conflict management associated with different information from the first resource manager and the second resource manager. This is associated with how each resource manager reports information in a slightly different manner. For example, a resource manager associated with a Microsoft® operating system may report attributes and statistics according to different parameters from a resource manager that might be associated with a Linux operating system. Thus, there is an intelligent layer either built into the workload manager 224 or into an intelligent front-end layer 222 that performs a service such that the workload manager decision making policies have common attributes upon which to make decisions for future provisioning as well as workload allocation. In other words, there is a filtering and processing that can occur such that there is a harmonization or a normalization of various attributes such that the view seen by the workload manager is consistent. A simplified example of this may be if one workload manager were to report statistics and attributes according to a metric system and another resource manager were to report statistics according to the English system, then there would need to be harmonization such that the statistics ultimately seen by the workload manager are normalized and therefore consistent. Clearly, this is a conceptual example in how harmonization of the various statistics may be done.

An aspect of the disclosure enables a workload manager or another interface to manager workload in the hybrid compute environment using a single cohesive resource space, a single cohesive policy space and a single cohesive accounting space such that there is a single and cohesive management space as well. Thus, an objective of the present disclosure is to provide a simplified environment with the manager or administrator in which a single method for submission management monitoring of workload and a single interface and single space in which all policies are defined, configured, controlled and optimized and a single space in which records are kept for accounting processing even though the images and the compute environment are constantly changing and various nodes are being reprovisioned into a different operating system then they were previously running Therefore, the present invention enables a commonality to exist and can manager a superset of all these spaces.

In a virtualization scenario, the state data that is communicated to a resource manager operates essentially as disclosed herein. All data from each operating system exists entirely within their space. Thus, a first operating system may be Linux and communicates data to its associated resource manager. A second operating system layered above the first also communicates its data to its resource manager.

In one aspect, the host operating system in virtualization does not maintain a separate resource manager. Each layered operating system then has a respective resource manager. Alternately, a monitor-only resource manager may communicate with the host operating system. The monitor-only resource manager which would report basic information such as that the node is operational, healthy, and capable of doing work and virtualization. The monitor-only resource manager would not be used to submit workload to the node and would not be used to modify or manipulate it. The reports for the monitor-only would be related to health-checks for the node and to report that the virtualization is good. Virtualization may be employed using Hyper-V within Windows Server 2008, VMWare, Xen or via other approaches as well as would be known.

A provisioning resource manager may be used by a workload manager to manage the actual provisioning or changing of the operating systems on a node, the changing of the software stack for a newly provisioned node, etc.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a transitory or non-transitory computer-readable medium as the medium will dictate. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A system for managing workload, the system comprising:
    a processor; and
    a computer-readable storage medium storing instructions which, when executed by a processor, cause the processor to perform operations comprising:
        periodically performing an analysis of a hybrid compute environment having at least one first node with a first operating system associated with a first resource manager and at least one second node with a second operating system associated with a second resource manager to determine how well the hybrid computing environment is aligned with an established policy associated with a distribution of the first operating system and the second operating system within the hybrid compute environment, wherein the established policy balances a portion of nodes in the hybrid compute environment between the first operating system and the second operating system according to certain parameter comprising one of historical use, current activity, pending workload, current network environment, compute environment condition, anticipated workload, and history associated with workload submission;

based on the analysis, changing at least one node from the first operating system to the second operating system;

receiving an instruction from a workload manager to provision at least one node in the hybrid compute environment from the first operating system to the second operating system, wherein each node in the hybrid compute environment communicates with the first resource manager associated with the first operating system and the second resource manager associated with the second operating system;

after provisioning the second operating system, pooling into a latency pool, at least one signal from the first resource manager associated with the at least one node and processing at least one signal from the second resource manager associated with the at least one node such that workload consumes resources associated with the at least one node having the second operating system provisioned thereon.

2. The system of claim 1, wherein the analysis is based on at least one historical use, a current activity, pending workload, and anticipated requirements.

3. The system of claim 1, wherein the changing further comprises provisioning the workload manager that issues a system job that provisions at least one node in compliance with a provisioning policy.

4. The system of claim 3, wherein the provisioning policy causes the system job to provision at least one node in between scheduled compute jobs.

5. The system of claim 1, wherein the changing further comprises provisioning using at least one of discfull provisioning, discless provisioning, or dual booting.

6. The system of claim 1, further comprising loading a user software stack on to one of the at least one node changed to the second operating system.

7. The system of claim 1, wherein the second operating system is a Microsoft® operating system.

8. The system of claim 1, further comprising:
remapping attributes and retaining accounting statistics from the first operating system to the second operating system.

9. The system of claim 1, further comprising:
translating, conflict mitigating, and conflict managing different information from the first resource manager and the second resource manager.

10. The system of claim 1, wherein a manager manages workload in the hybrid compute environment using a single cohesive resource space, a single cohesive policy space, a single cohesive accounting space, and a single cohesive management space.

* * * * *